United States Patent [19]

Foord

[11] Patent Number: 4,868,539
[45] Date of Patent: Sep. 19, 1989

[54] BI-DIRECTIONAL MULTI-FREQUENCY RIPPLE CONTROL SYSTEM

[75] Inventor: Peter M. Foord, Eastwood, Australia

[73] Assignee: Electricity Trust of South Australia, Eastwood, Australia

[21] Appl. No.: 89,663

[22] Filed: Aug. 24, 1987

Related U.S. Application Data

[63] Continuation-in-part of Ser. No. 723,615, Apr. 15, 1985, abandoned.

[30] Foreign Application Priority Data

Apr. 17, 1984 [AU] Australia .............................. PG4614

[51] Int. Cl.$^4$ ........................................... H04M 11/04
[52] U.S. Cl. .............................. 340/310 A; 340/310 R
[58] Field of Search ........ 340/310 A, 310 R, 310 CP; 307/3, 39, 40; 364/492; 375/96, 97, 103; 455/307

[56] References Cited

U.S. PATENT DOCUMENTS 4,106,007 8/1978 Johnson et al. ................. 340/310 A
4,359,644 11/1982 Foord .............................. 340/310 R

FOREIGN PATENT DOCUMENTS 29193 5/1969 Australia ......................... 340/310 R Primary Examiner—David K. Moore
Assistant Examiner—M. Fatahiyar
Attorney, Agent, or Firm—Baker, Maxham, Jester & Meador

[57] ABSTRACT

A ripple control system in which an audio frequency signal is superimposed on an electric power distribution system wherein the receiver has a pair of lock-in amplifiers driven 90° out of phase with each other, the outputs of which are squared and summed to form an output independent of phase. For discrimination, a microcomputer is programmed for logically examining the time between zero crossings of each of the outputs of the lock-in amplifiers so as to check the output frequency thereof and completely reject the incoming signal when the output frequency exceeds an acceptable level. This system provides a very narrow band frequency detector for the receivers and enables the use of a large number of closely spaced frequencies for the formation of signalling codes.

17 Claims, 14 Drawing Sheets

BI-DIRECTIONAL MULTI-FREQUENCY RIPPLE CONTROL SYSTEM

This application is a CIP of 06/723,615 filed 4/15/85, now abandoned.

FIELD OF THE INVENTION

This invention relates to improvements in a ripple control system, that is, a means and method for transmitting and receiving information through an alternating current power distribution system.

BACKGROUND OF THE INVENTION

Ripple control has been used in the past to transmit information from a power source to a load and thus afford remote control of that load, for example, for control or water heaters, street lighting or the like.

Reference can be made to our Australian Patent No. 531592 (47714/79) (corresponding to UK No. 2022890, USA No. 4,359,644, Canada No. 1127710, Switzerland No. 633388 and other overseas patents) which described and claimed a system for the control of loads wherein sequential wave form distortion (SWD) signals were transmitted from a power sub-station to a consumer, a transmitter at the sub-station being coupled to the system to derive power from the system and generate a signal the frequency of which was synthesized from and locked to the power frequency, imposing the signal on the power frequency wave form as a sequence of wave form distortions, and the receiver was also coupled to the system and had a detector circuit comprising a pair of correlators (synchronous filters) driven 90° out of phase with each other by a control frequency synthesized from and locked to the power frequency and having a frequency the same as the signal frequency, such that the signal input to the correlators appeared as a D.C. voltage output thereof, a squaring circuit was coupled to the signal output of each correlator and a summing circuit coupled to the squaring circuits, arranged so as to square and sum the D.C. voltage outputs of the correlators.

The differences between the sequential wave form distortion (SWD) control and conventional ripple control are that the signal was produced as a sequence of wave form distortions by applying a controlled oscillatory load to the power system, the frequency of the signal being locked to the supply frequency, and the synchronous correlation method of signal detection was used.

A series of tests have indicated that the main advantage of the SWD control over other (prior art) ripple control is its simplicity and lower cost, and also that most of the receiver circuit can be contained in a custom integrated circuit together with a microcomputer chip and no components are critical. The signal magnitude required for SWD control is about 10 to 20 percent of that required for ripple control and the reduced signal magnitude avoids many of the problems of interference with consumer apparatus sometimes experienced with ripple control.

BRIEF SUMMARY OF THE INVENTION

The main object of this invention is to provide improvements to the SWD control system of aforesaid U.S. Pat. No. 4,359,644. In that patent there was described a synchronous filter (more properly called a "lock-in amplifier") wherein a pair of correlators were in quadrature and thereby were not phase sensitive. A code was utilised, employing closely spaced frequencies. (In this specification, the term "lock-in amplifier" is used instead of "synchronous filter", being more accurate).

In this invention, improvements comprise a receiver wherein the receiver has a pair of lock-in amplifiers driven 90° out of phase with each other, the outputs of which are squared and summed to form an output independent of phase, and discrimination means comprise a microcomputer programmed for frequency checking of each lock-in amplifier output, this being effected by utilising a microcomputer programmed for logically examining the time between zero crossings of each of the outputs of the lock-in amplifiers so as to check the output frequency thereof and completely reject the signal when the output frequency exceeds a predetermined level, thus producing a very narrow band frequency detector for the receiver and enabling the use of a large number of closely spaced frequencies for the formation of signalling codes.

This improvement results in the lock-in amplifiers of the receivers having a much narrower detection band characteristic. This enhancement allows the full noise rejection advantage of synchronous correlators to be retained together with non-phase sensitivity. The selectivity is such that frequencies as closely spaced as 0.3 Hz can be used to form a multifrequency system of coding. This results in a very large number of usable frequencies between 200 and 1000 Hz and hence groups of unique frequencies can be assigned to each sub-station of a power system and thus overcomes all problems due to spillover of signal from one sub-station to the next via the high voltage supply system.

In our earlier said U.S. Pat. No. 4,359,644, a microcomputer was suggested for signal computation, code discrimination and frequency synthesis.

Signal computation refers to the process of squaring and summing the outputs of each synchronous filter and comparing with a threshold level.

Code discrimination refers to the process of checking that the code received matches the code manually programmed into the receiver by the channel selection switches (72 of FIG. 8).

Frequency synthesis refers to the process of generating the control frequencies by phase locked loop principles.

None of the above three functions refers to checking the outputs of the synchronous filters by timing the periods between their zero crossings.

FIG. 9 of 4,359,644 shows that the output of each synchronous filter (lock-in amplifier) goes into voltage to pulse width converter 63 which acts as an analogue to digital converter for signal measurement.

Microcomputers are necessarily part of this invention, but the arrangement differs from the above described arrangement in a number of respects, probably the most important of which is that the microcomputer is programmed to examine the zero crossings, an extremely simple and accurate way of determining frequency of the signals.

The invention further relates to improvements enhancing the operation of the oscillating load transmitter circuit. By suitable arrangement of the thyristor firing signals the level of oscillation in the transmitter circuit can be controlled. This allows the level of oscillation to be set electronically rather than by heavy current component design.

These two enhancements enable the scheme to be used also for the transmission of information to be bi-directional, and include transmission upstream from a load (i.e. consumer) to a power source (i.e. sub-station). Because oscillation of the transmitter circuit can be enhanced, circuit resistances are no longer critical to the level of oscillation. This is a significant factor in designing a low cost transmitter. Because multi-frequency coding can be used, decimal data (e.g. a meter reading) can be transmitted at a speed which is acceptable.

Data pertaining to various other aspects of electrical power transmission can also be transmitted back to a central sub-station, reducing the need for an operator to travel.

The transmitter and receiver costs for equipment in accordance with this invention are much lower than for conventional ripple control equipment. The extremely narrow band detector of the receiver not only increases availability of a large number of signal frequencies but also gives much better rejection of noise signals than normal ripple control receivers and because of this a much lower level of signal power can be used. The low signal power enables a small transmitter to be used and this contributes to the low cost. The two lock-in amplifiers (i.e. correlators, or synchronous filters) can be built onto a silicon chip and require no critical components for tuning thus contributing to the low cost of the receivers, and this is enhanced by a microcomputer algorithm. The transmitter may be of very simple design and consists of a capacitor in hseries with an inductor and switched to the power supply system with a pair of inverse parallel connected thyristors. Control of the thyristors is such that the circuit is made to oscillate in a discontinuous manner at a selectable signal frequency. Critical tuning of the capacitor and inductor is not required, since the resonant frequency thereof is always greater than the signal frequency. By using different signalling frequencies at each sub-station the problem of signal spillover from one sub-station to another is removed. It is, however, important that the signal itself should lie within close limits, and use can be made alternatively of crystal control means to control signal frequency, or the control means referred to in said patent No. 4,359,644 is equally as effective. Of these alternatives, crystal control has been found to be simpler and cheaper, but embodiments of both are described hereunder.

The system synthesises identical control frequencies in both the transmitter and receiver. If the control means of 4,359,644 is employed, the control frequency is synthesised by multiplying the power supply frequency by an integer using a phase locked loop multiplier circuit and then dividing by another integer. The control frequency is then used in the transmitter to control the oscillation of the inductive capacitive load and in the receiver to control the centre frequency of the lock-in amplifier. In this way a very precise signal frequency can be transmitted which can be detected by a very narrow band detector.

The input element of the receiver may also consist of two lock-in amplifiers each consisting of a pair of solid state (e.g. CMOS) change-over switches between a resistor and a capacitor. The change-over switches are driven by the control frequency but one is driven 90° out of phase with the other. The output frequency of these two lock-in amplifiers will be equal to the difference between the signal frequency and the control frequency. Hence if the signal frequency is identical to the control frequency then the output frequency will be zero, that is a D.C. voltage. The total signal received is formed by combining the outputs from the two lock-in amplifiers such that if P and Q are the separate outputs from each amplifier and S is the combined output then $$S = \sqrt{P^2 + Q^2}.$$

The discrimination range of the overall lock-in amplifier is made narrower by checking the frequency of both P and Q by timing between their zero crossings. The incoming signal is rejected if the frequency of both P and Q is higher than a predetermined difference frequency. It is this feature which achieves the very narrow detection range, and in turn makes available a large number of signal frequencies to be usable in a CODE, even though the signal frequency may be below 1000 Hz. Availability of a large number of CODES makes it viable to signal "upstream" data from the consumer.

As an alternative to synthesising this control frequency by multiplying the mains frequency by an integer using a phase locked loop multiplier circuit and then dividing by another integer, a crystal oscillator can be used to generate a base frequency and this base frequency is then divided by an integer to form the control frequency. In order to keep the difference between the transmitter control frequency and the receiver control frequency acceptably low the tolerances on the crystals need to be limited. Suitable tolerances are ±10 parts per million for the transmitter and ±200 parts per million for the receivers. This allows low cost crystals to be used in the receivers.

When transmitting from a power source, for example a sub-station, the discontinuous oscillatory current in the large transmitter will distort the power system voltage in proportion to the rate of change of current, since the source impedance is almost entirely inductive. Hence a signal of the desired frequency is generated on the power system voltage as a sequence of wave form distortions.

A similar system is used for transmission in each direction. There is a difference, however, in that when transmitting "downstream" from a power source to a load the signal appears as a voltage superimposed on the power system voltage and when transmitting "upstream" from a load to a power source the signal appears as a current superimposed on the power system load current.

When transmitting from a load, that is from a consumer to a sub-station, the discontinuous oscillatory current of the small transmitter is isolated from the high voltage distribution lines at the sub-station by means of a current transformer. The output of the current transformer is passed through an impedance to convert it to a voltage then high pass filtered to remove most of the 50 Hz frequency. After amplification it is detected with the same lock-in amplifier arrangement.

BRIEF DESCRIPTION OF THE DRAWINGS

Reference is now made to the accompanying drawings, in which.

Figure 1:
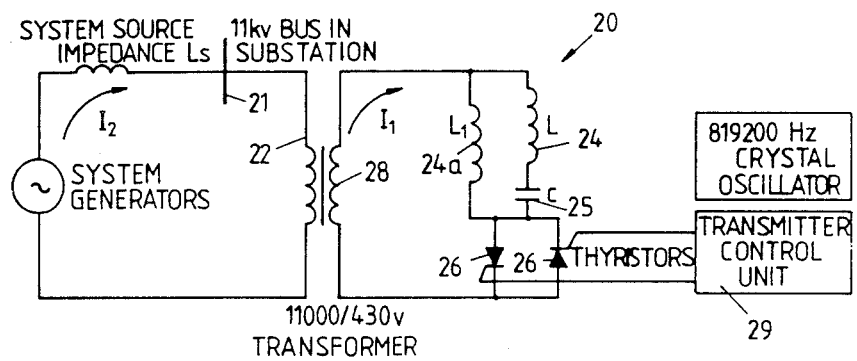
FIG. 1 shows the basic transmitter.

In the basic transmitter 20 (FIGS. 1, 2 and 3), a signal is produced on the distribution bus 21 (11 kV or equivalent) of a sub-station which is then prepared via the 11 kV feeders 22 and 11 000/415 volt distribution transformers 23 to consumers. The signal appears at consumer premises between 240 volt active and neutral on all three phases simultaneously.

With SWD control, the signal generating circuit is a switched LC load 24, 25 and results in a substantially constant load current $I_1$.

Figure 2:
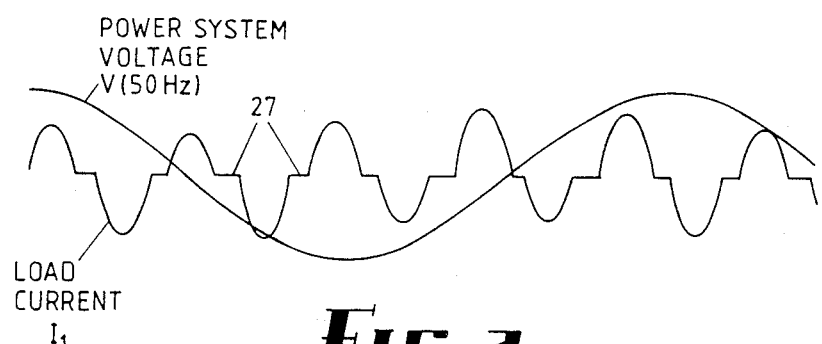
FIG. 2 shows, in simplified form, the system voltage and load current relationship of the basic transmitter.

The basic transmitter arrangement (in single phase form) is shown in FIG. 1 and the load current relationship to the system voltage in FIG. 2.

The transformer load consists of an air cored inductance 24 in series with a capacitor 25 and switched by means of inverse parallel connected thyristors 26. As shown in FIG. 2, the load current does not flow continuously but has an "off" period 27 between each pulse. This off period is achieved by making the resonant frequency of the LC combination higher than 1.15 times the control frequency. The actual resonant frequency is not critical and hence it is not necessary to use expensive critically tuned components. The off period ensures the successful operation of the circuit and contributes to the simplicity of the design. Its presence causes the LC circuit to receive energy from the 50 Hz supply and hence oscillation can be maintained. The start of each current pulse is controlled by the firing of one or other of the thyristors by the control frequency (signalling frequency). The thyristors are commutated off as the current pulse goes to zero. This off period is varied with the arrangements which are described hereunder with reference to FIGS. 17, 18 and 19.

Figure 1A:
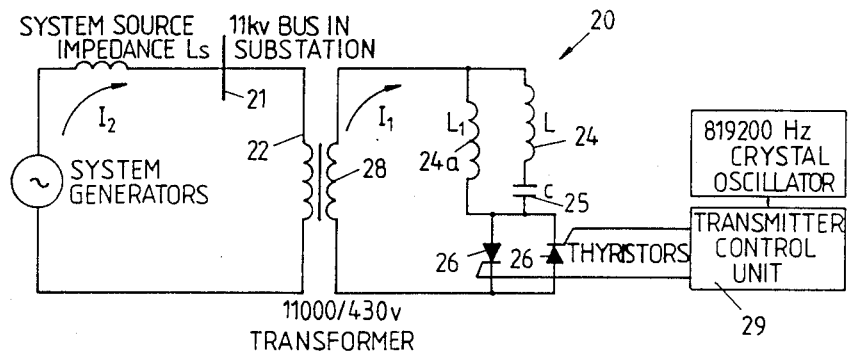
FIG. 1A is a modification of FIG. 1, using a second inductor, and also a crystal.

The operation of the basic transmitter circuit can be enhanced by the addition of an inductor 24a (L1) across the series LC combination. The level of current oscillation in the circuit can be increased and controlled by varying the value of this additional inductor. The circuit arrangement is shown in FIG. 1A (which also shows the alternatively used crystal oscillator).

When the second inductor 24a is used, during each gap in oscillation, that is, after each half cycle of oscillation when the thyristors are open, stored energy from the inductor 24a flows into the series LC circuit thus increasing the level of oscillation.

Figure 16:
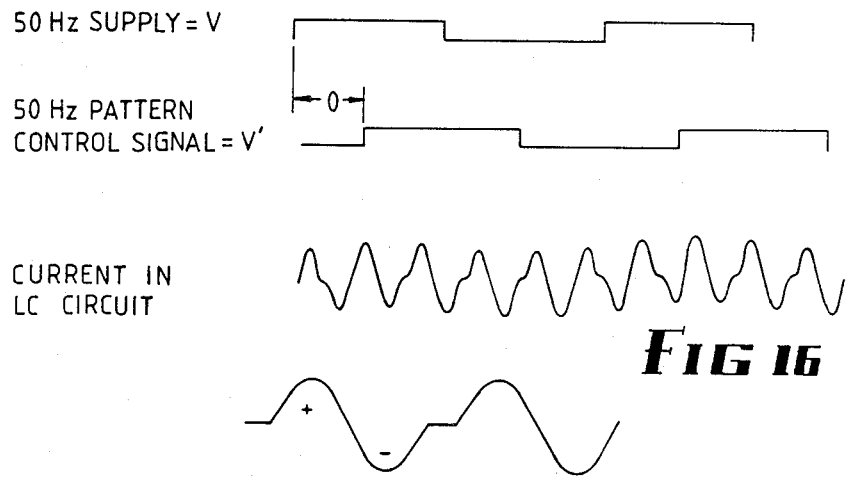
FIG. 16 illustrates the relationship between power frequency, thyristor firing pattern frequency, and oscillating current in the LC circuit.

The operation of this circuit can further be enhanced by suitable control of the thyristor firing signals from the transmitter control unit 29. This control fires the thyristors in a pattern, the pattern frequency being the same as the power system frequency V but phase shifted from it by angle 'θ' to V' as shown in FIG. 16.

Figure 17:
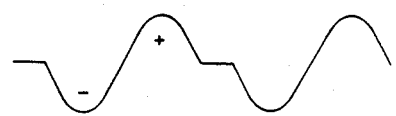
FIG. 17 shows the waveform when $V^1$ is high (above) and low (below) (compare FIG. 16)

The thyristors are fired such that when V' is high oscillation current is continuous from the positive half cycle to the negative, and when V' is low oscillation current is continuous from the negative half cycle to the positive (FIG. 17).

By varing the phase shift between V and V', i.e. θ, the magnitude of oscillation current in the LC circuit can be varied over at least a 4:1 range. In this way the oscillation current can be set to the desired level.

Figure 18:
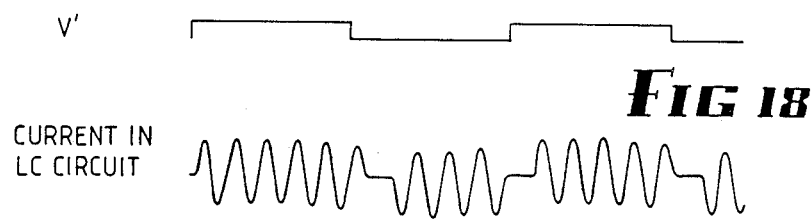
FIG. 18 shows the pattern used for intermediate frequencies (e.g. 400 to 550 Hz)

Further variations on this theme are then used depending on signal frequency. The arrangement just described is used for the lower frequencies 200 to 400 Hz. For intermediate frequencies 400 to 550 Hz the arrangement of FIG. 18 is used.

In this arrangement continuous oscillation is allowed for each half cycle of the 50 Hz pattern control signal V' except that a full cycle gap follows each transition of V'. In this arrangement the resonant frequency of the LC combination is close to the control frequency.

Figure 19:
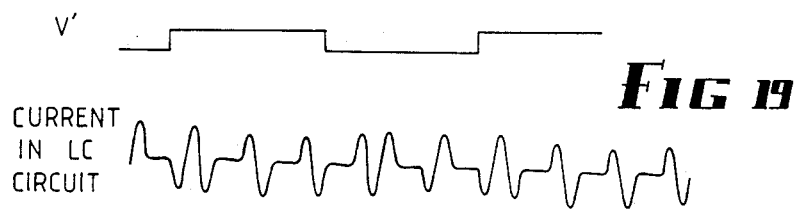
FIG. 19 shows the pattern used for higher frequencies (e.g. above 550 Hz)

For the higher frequencies, 550 Hz and above, the arrangement of FIG. 19 is used.

This arrangement is similar to the first arrangement (i.e. that used for low frequencies) except that the gap here lasts for a full cycle of the oscillation current and the resonant frequency of the LC combination is close to the control frequency.

In one embodiment the control frequencies for firing the thyristors are always derived from the 50 Hz supply and hence are always locked to it. These frequencies are obtained by first multiplying the 50 Hz by an integer in a phase locked loop ciruit 30 (FIG. 6) and then dividing by a different integer. In the system herein described a fixed multiplier of 4096 is used and the different frequencies are then formed by dividing by a factor $K_D$. Hence the basic frequency equation is $$Fc = \frac{50 \cdot 4096}{K_D} = \frac{204800}{K_D}$$

A second embodiment uses a crystal oscillator to generate the control frequencies according to the same formula, i.e.

$$Fc = \frac{204800}{K_D}$$

In this embodiment the control frequencies are not locked to the supply frequency.

Eight frequencies are allocated to each sub-station and the same transmitter LC components can be used for each group of 8. Only the control frequency need alter.

As the source impedance of the power system (i.e. from the generators to the 11 kV bus 21) is almost entirely inductive, current $I_2$ in FIG. 1, reflected from the oscillating load, will produce a voltage distortion on the 11 kV bus which is proportional to the rate of change of current (i.e.

$$V_D = \frac{L_s dI_2}{dt}).$$

Hence a voltage of the same frequency as the current will be produced on the 11 kV bus.

Figure 3:
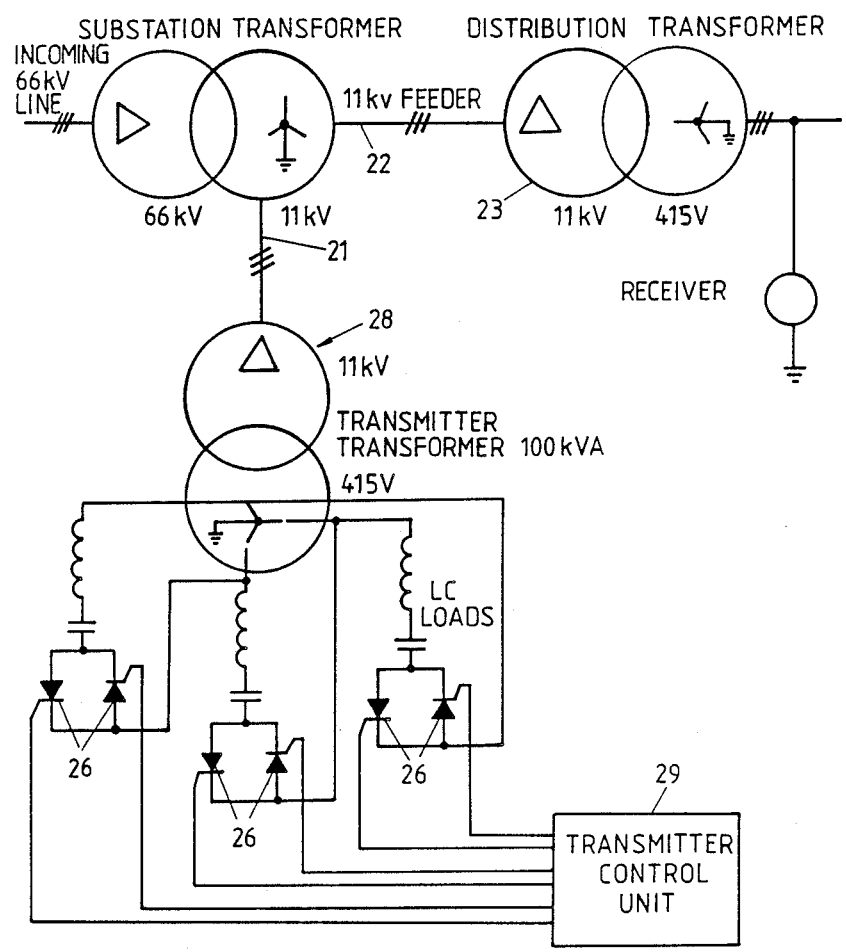
FIG. 3 shows the system arrangement for downstream transmission.

In a power system, this arrangement is implemented on a three phase basis, the current in each phase being 120° apart at the signalling frequency. The system arrangement is shown in FIG. 3.

The minimum magnitude of signal voltage required is 0.16% of system voltage with the receivers set at a threshold level of 0.08%.

A CODE consists of either 2 or 3 bits, each bit of all bits must be between specified limits.

The spacing between the START bit and the first CODE bit is also used to define different functions. Four different spacings are used.

Hence the basic code is as follows:

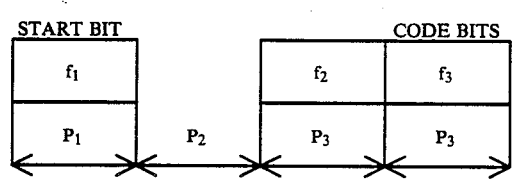

Addresses are formed by defining frequencies $f_1$, $f_2$ and $f_3$ of the code.

Functions are formed by defining the periods $P_1$ and $P_2$.

By allocating 8 frequencies to each sub-station the following can be formed with the above code:
512 addresses
20 functions at each address.

The 20 functions are arranged as follows:

| FUNCTION NO. | START BIT DURATION $P_1$-SECS | SPACING BETWEEN START & FIRST CODE BIT $P_2$ SECS | NUMBER OF CODE BITS | NUMBER OF ADDRESSES AFFECTED | OPERATE TIME SECS. |
|---|---|---|---|---|---|
| 1 | 5 | 0 | 2 | 1 | 12.1 |
| 2 | 5 | 1.2 | 2 | 1 | 13.4 |
| 3 | 5 | 2 | 2 | 1 | 14.2 |
| 4 | 5 | 2.8 | 2 | 1 | 15.0 |
| 5 | 6.4 | 0 | 1 | 64 | 10.0 |
| 6 | 6.4 | 1.2 | 1 | 64 | 11.2 |
| 7 | 6.4 | 2 | 1 | 64 | 12.0 |
| 8 | 6.4 | 2.8 | 1 | 64 | 12.8 |
| 9 | 7.8 | 0 | 1 | 8 | 11.4 |
| 10 | 7.8 | 1.2 | 1 | 8 | 12.6 |
| 11 | 7.8 | 2 | 1 | 8 | 13.4 |
| 12 | 7.8 | 2.8 | 1 | 8 | 14.2 |
| 13 | 9.2 | 0 | 1 | 1 | 12.8 |
| 14 | 9.2 | 1.2 | 1 | 1 | 14.0 |
| 15 | 9.2 | 2 | 1 | 1 | 14.8 |
| 16 | 9.2 | 2.8 | 1 | 1 | 15.6 |
| 17 | 10.6 | 0 | 1 | 8 | 14.2 |
| 18 | 10.6 | 1.2 | 1 | 8 | 15.4 |
| 19 | 10.6 | 2 | 1 | 8 | 16.2 |
| 20 | 10.6 | 2.8 | 1 | 8 | 17.0 |

All bits are terminated by reversing the phase of the transmitted signal for 0.6 secs. For example the first START bit listed above consists of

| $f_1$ | $f_1 < 180$ |
|---|---|
| 4.4s | 0.6s |

Figure 8:
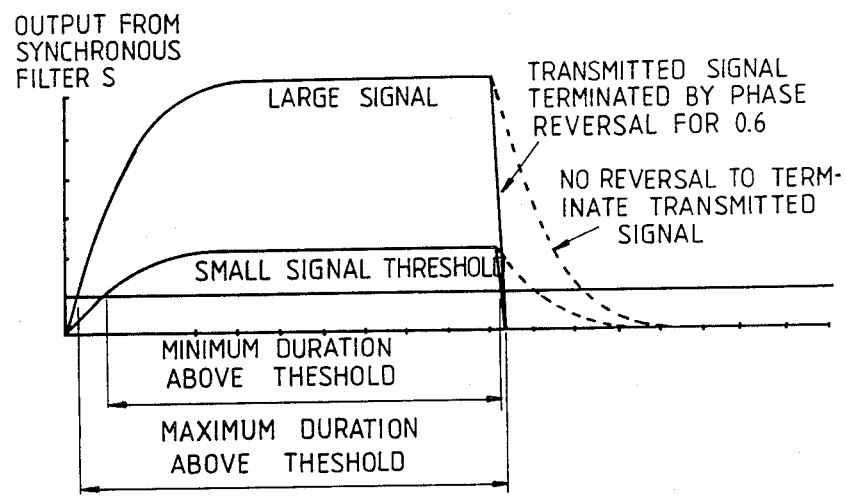
FIG. 8 shows the lock-in amplifier output.

This helps to precisely define the duration of each bit, by producing the sharp cut-off shown in FIG. 8, which compares the otherwise long decay time, shown in dotted lines.

The total duration of each CODE bit is 3.6 secs i.e. 3.0 secs followed by 0.6 secs with phase reversed.

The basic formula for determining frequency is $$Fc = \frac{204800}{K_D}$$

where $K_D$ is an integer.

Frequencies above 200 Hz have been formed into GROUPS each GROUP consisting of 8 frequencies formed by 8 adjacent values of $K_D$. The frequencies closer than ±10 Hz of odd and ±5 Hz of even harmonics of 50 Hz are avoided as they occur naturally on the power system. A binary divider is used in the receivers for $K_D$ and the boundaries of each GROUP are determined when the 3 least significant bits of $K_D$ are 000 and 111.

A 10 bit programmable divider is used for $K_D$ and controlled as follows:

| $b_9\ b_8\ b_7\ b_6\ b_5\ b_4\ b_3\ b_2\ b_1\ b_0$ | | Frequency |
|---|---|---|
| $X_9\ X_8\ X_7\ X_6\ X_5\ X_4\ X_3$ | $X_2\ X_1\ X_0$ | $f_1$ |
| as above | $Y_2\ Y_1\ Y_0$ | $f_2$ |
| as above | $Z_2\ Z_1\ Z_0$ | $f_3$ |

X, Y & Z are manually programmed into each receiver to set its address code.

The selection of which GROUP of frequencies to use for any one sub-station will be determined by the power system characteristics. The main parameter which will affect selection will be the existence of 11 kV capacitor banks on the system, either as a large bank mounted in a sub-station, or smaller banks installed out along feeders. The existence of these banks will make it more economical to use the lower frequencies whereas if capacitor banks are not present, the higher frequencies will result in smaller transmitter components. Capacitor banks installed on the higher system voltage, i.e. 66 kV, will have negligible effect on signal generation. Since capacitor banks are not part of the invention, they are not illustrated herein.

Figure 4:
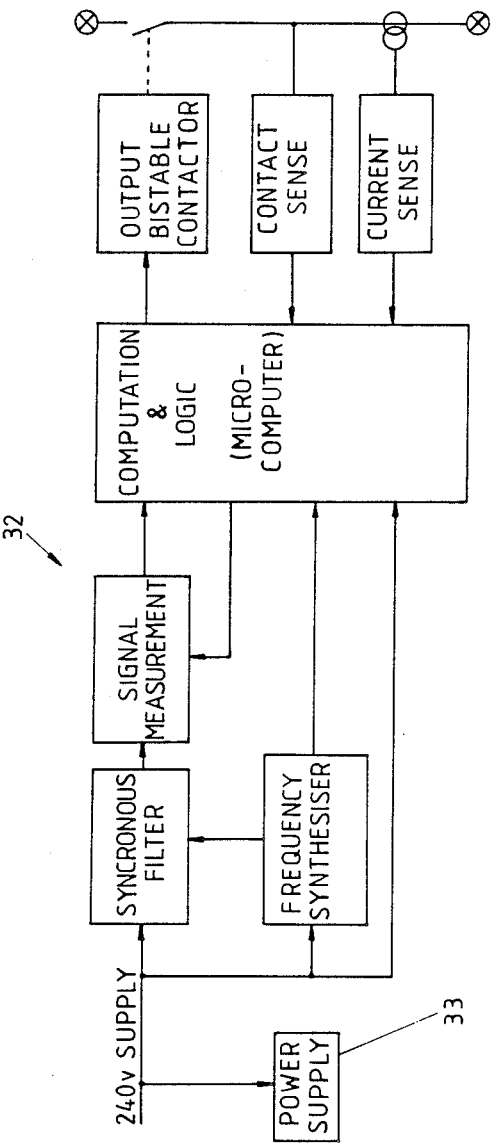
FIG. 4 is a block diagram of the receiver.
Figure 5:
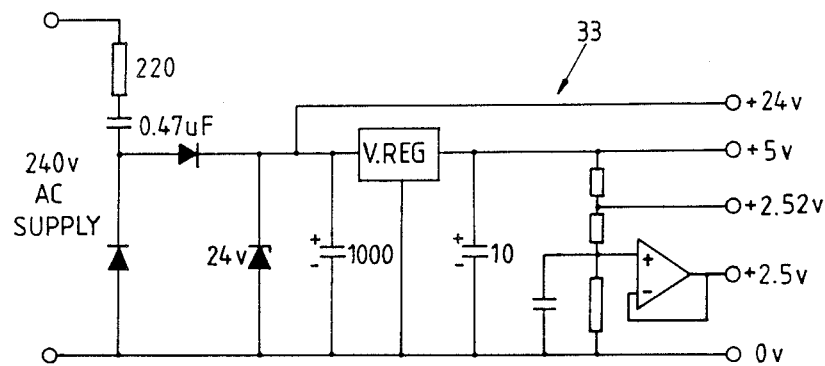
FIG. 5 is a circuit diagram of the receiver power supply.
Figure 13:
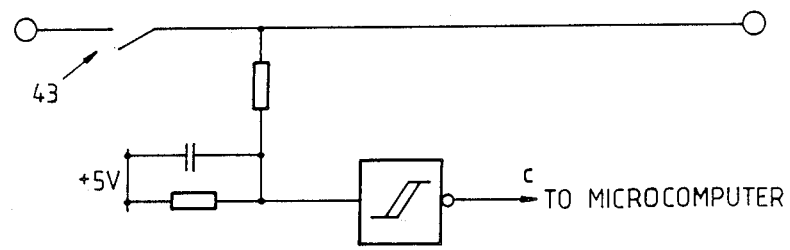
FIG. 13 shows the contact sensing means, FIG. 14 indicates the basic arrangement for upstream signalling.
Figure 15A:
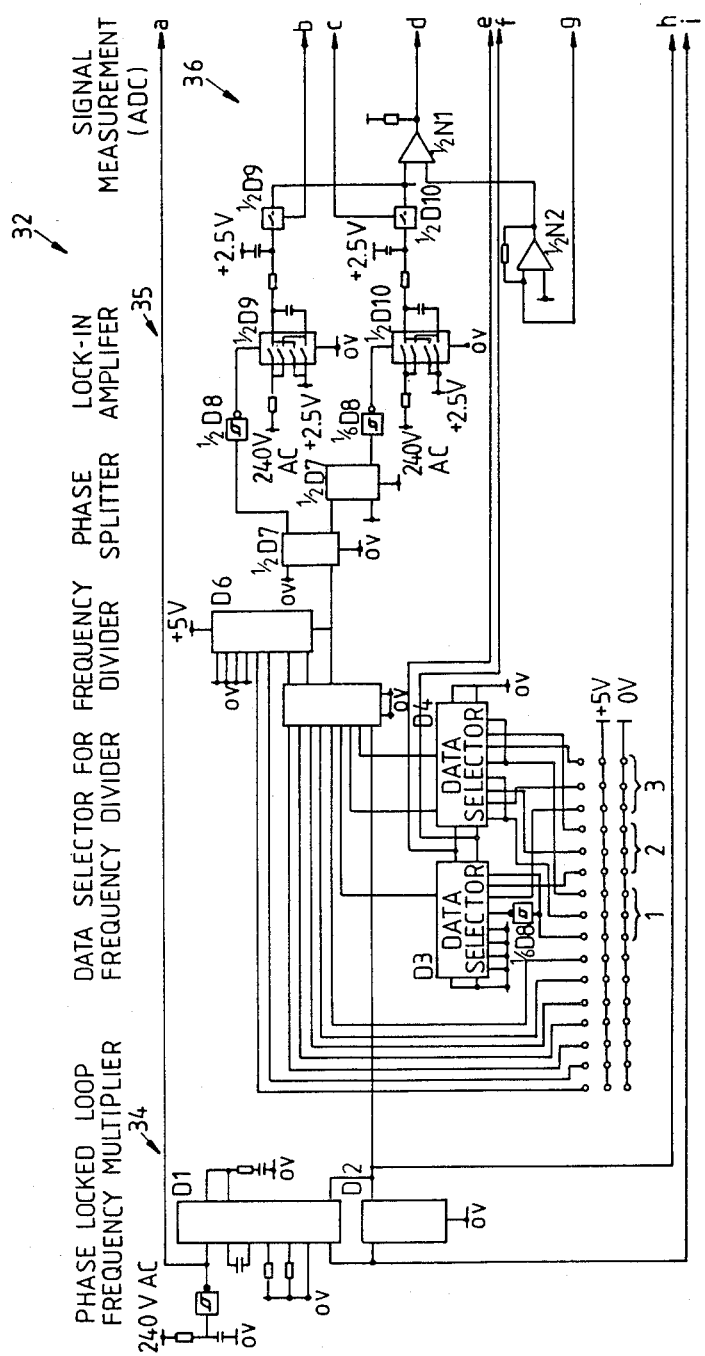
FIGS. 15A and 15B show a detail drawing of the overall receiver circuit.
Figure 15:
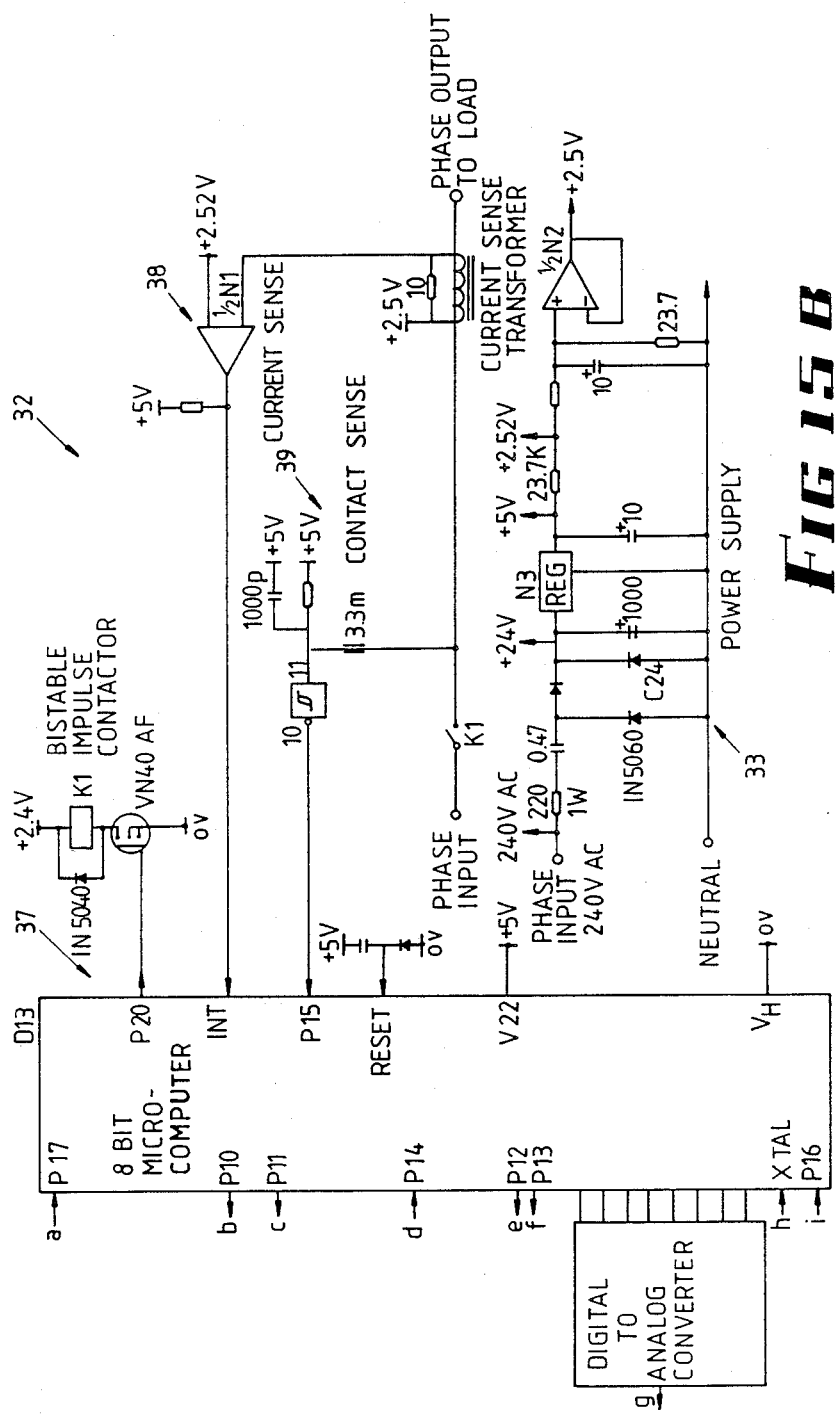

The receiver 32 (FIG. 15) may be divided into 8 separate functional blocks as follows:
1. Power supply 33 (FIGS. 4, 5 and 15).
2. Frequency synthesiser 34 (FIG. 15).
3. Lock-in amplifier 35 (FIGS. 7 and 15).
4. Signal measurement 36 (FIGS. 9 and 15).
5. Computation and logic 37 (FIG. 15).
6. Current sense 38 (FIG. 15).
7. Contact sense 39 (FIG. 15).
8. Output bi-stable contactor 43 (FIG. 13).

By using CMOS integrated circuits throughout, the power supply only needs to provide a few milliamps. It can therefore be made very simple by using a capacitive divider, rectifier and regulator direct from the 240 V AC supply (see FIG. 5).

The frequency synthesiser section is built up using a standard phase locked loop multiplier 40 followed by a programmable divider 41 to form the required control frequency.

The 50 Hz is multiplied by 16,384 and then divided by an integer $K_D$ which is manually programmed in. This results in a frequency four times the desired control frequency and is subsequently divided to produce two control signals at the desired frequency but in quadrature (i.e. one displaced 90° from the other). The selection of frequency $Fc_1$, $Fc_2$ or $Fc_3$ is controlled by the data selectors D3 and D4 (FIG. 6).

Figure 6A:
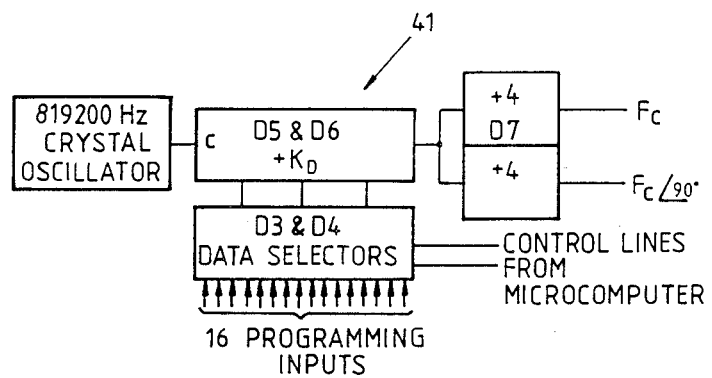
FIG. 6A shows the modification to FIG. 6 when a crystal is included in the receiver.
Figure 6:
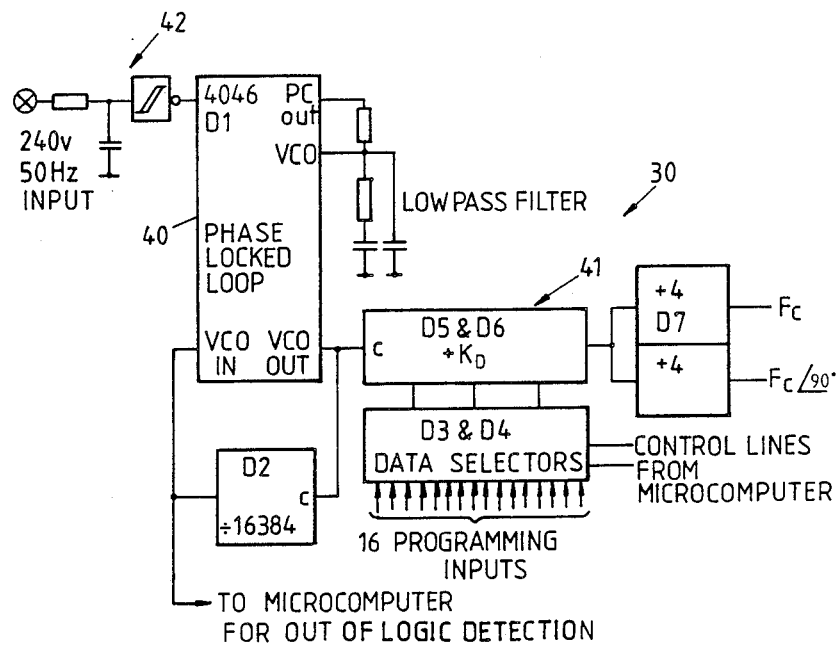
FIG. 6 shows the phase locked loop frequency synthesiser.

A single stage RC filter and Schmitt trigger circuit 42 are used to condition the 50 Hz input signal from the supply to the phase locked loop (FIG. 6).

The low pass filter from the phase comparator output on the phase locked loop to the voltage controlled oscillator (VCO) input needs to have a fairly long time constant for stability. For the same reason the VCO range selection resistors need to confine the VCO frequency to about ±10% of centre frequency.

The lock-in amplifiers 35 (or correlators) form the heart of the receiver circuit. These circuits extract the signal frequency from the 50 Hz supply and do so in a very selective manner.

Figure 7:
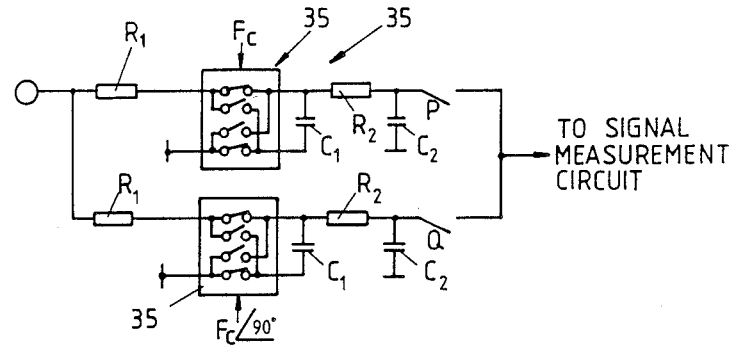
FIG. 7 shows the lock-in amplifier arrangement used in the receiver.

Each lock-in amplifier 35 consists of a pair of solid state change-over switches in the middle of an RC filter (R1 C1), followed by a second stage of RC filtering (R2 C2) for smoothing, as shown in FIG. 7.

Figure 10:
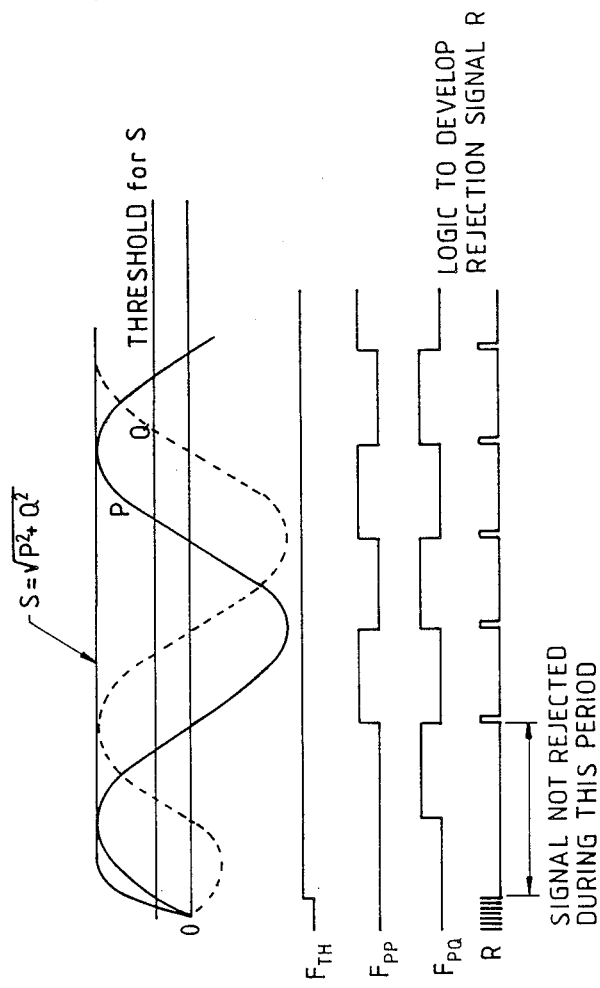
FIG. 10 is a graphical repesentation of time checking of the lock-in amplifier outputs.

Reference may be made to FIG. 10. If the frequency driving the switches is the same as the transmitted frequency and both are in phase then the switches will act as a synchronous rectifier and the rectified signal voltage will appear as a D.C. voltage on capacitor C2. When the signal frequency is 90° out of phase with the lock-in amplifier frequency, zero signal voltage will appear on C2. If the correlator frequency is very slightly different from the transmitted frequency then, in effect, their phase relationship will change through 360° at a rate equal to the difference frequency, with the result that the voltage appearing on capacitor C2, will be low frequency AC. By using two lock-in amplifiers driven by control frequencies which are in quadrature (90° apart) and taking the square root of the sum of their squares, a non-phase sensitive detector is formed, i.e.

$$S = \sqrt{P^2 + Q^2}$$

where S=total signal P and Q are outputs from each lock-in amplifier.

Figure 11:
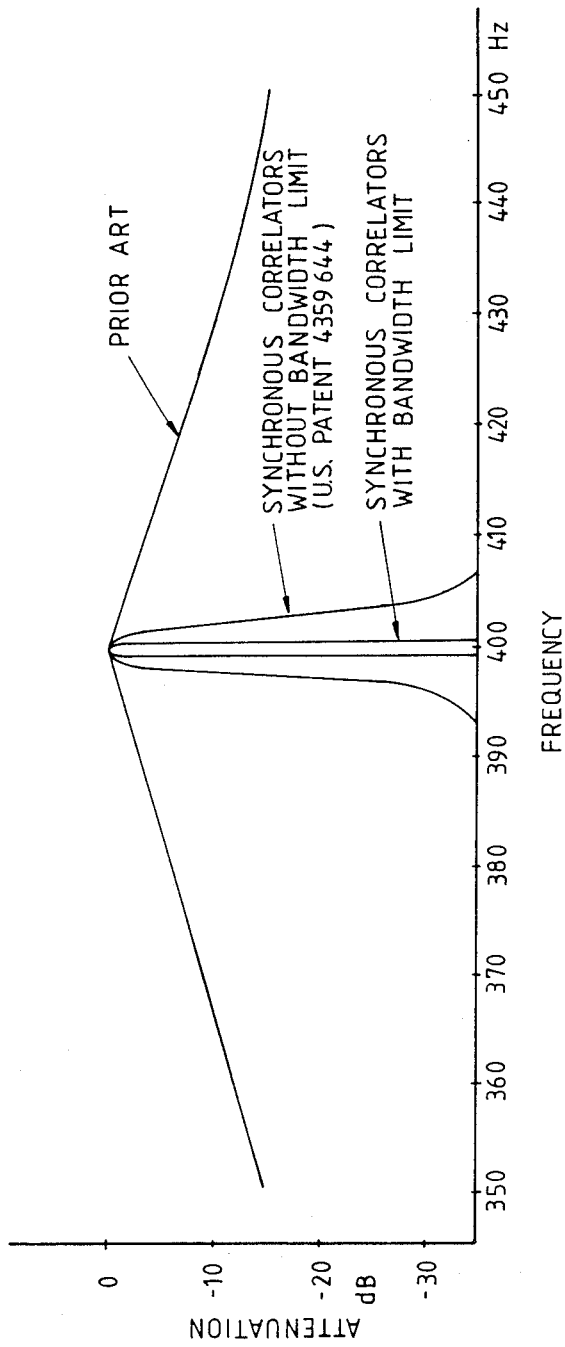
FIG. 11 shows the narrow band detector available with the invention, illustrating, by way of comparison, a typical prior art bandpass width curve; a bandpass width curve obtainable with our earlier U.S. Pat. No. 4,359,644; and in the very narrow bandpass width obtainable with this invention.

By time checking the zero crossing of each correlator output (i.e. P and Q) separately, a limit can be set on the low frequency AC output referred to above. In this way the detector characteristic can be made extremely narrow and complete rejection of all frequencies outside the bandpass can be obtained (FIG. 11). For example, with a time check of 2.4 seconds, complete rejection of all frequencies outside of ±0.2 Hz of the centre frequency is obtained.

As the 240 V 50 Hz voltage is very much larger than the signal voltage it will appear on capacitor $C_1$ as a ripple voltage. A second stage of RC filtering (R2 C2) is used to eliminate this ripple.

The total lock-in amplifier circuit, as shown in FIG. 7, gives ground referenced outputs at P and Q which are then sampled into the measurement circuit.

Due to the RC time constants of the lock-in amplifiers, outputs P and Q will have slow rise and fall times. By reversing the phase (i.e. 180° phase change) of the transmitted signal for the last 0.6 seconds of each bit the fall times of P and Q can be made much shorter and the signal duration above threshold then becomes almost independent of signal magnitude. This minimises transmission time and allows bit duration to convey information. This is referred to above and illustrated in FIG. 8.

Figure 9:
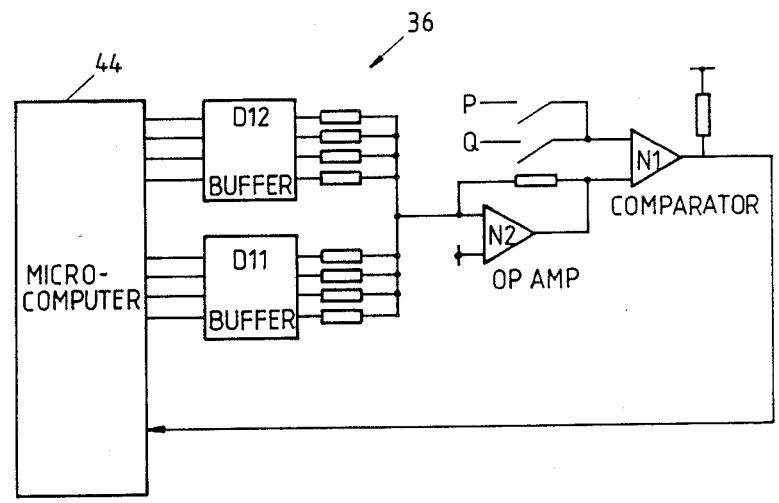
FIG. 9 shows the arrangement used for signal measurement.

The signals P and Q from each of the lock-in amplifiers are measured alternately each second cycle of the 50 Hz, i.e. every 40 milliseconds. A digital to analogue converter circuit is used controlled by a successive approximation routine in a microcomputer. FIG. 9 shows the circuit used.

All the computation and logic for the receiver is carried out in the microcomputer 44. (Microcomputer 44 is a Philips PCD3343, available from Phillips, Eindhoven, Holland).

As mentioned above the microcomputer 44 takes a digital measurement of each of the two lock-in amplifier outputs. The total signal S is then computed from $$S = \sqrt{P^2 + Q^2}.$$

In addition, when S is below threshold, long running averages, (using 256 samples) are also computed of P and Q and these values then used for zero correction. For most of the time no signal is presence and hence if the signal is averaged with a long time constant it represents the residual signal.

Such a residual can be present due to cross talk and leakage current in the switches, bias current in the comparator and offset voltages in the comparator and operational amplifier. If the averaging time constant is made very long compared to the signal duration the running average will not change appreciably during the receipt of a signal. The residual measurements for P and Q are then substracted from P and Q to give corrected readings.

The signal is tested for magnitude and the time it is above a set threshold is measured. The CODE bits have the shortest duration and they require that the signal is above threshold for at least 2.4 seconds but not more than 3.8 seconds. START bits with five different durations are used and they have the following limits.

| START BIT | MIN. DURATION SECS. |
|---|---|
| 1 | 3.8 |
| 2 | 5.2 |
| 3 | 6.6 |
| 4 | 8.0 |
| 5 | 9.4 |

Figure 20:
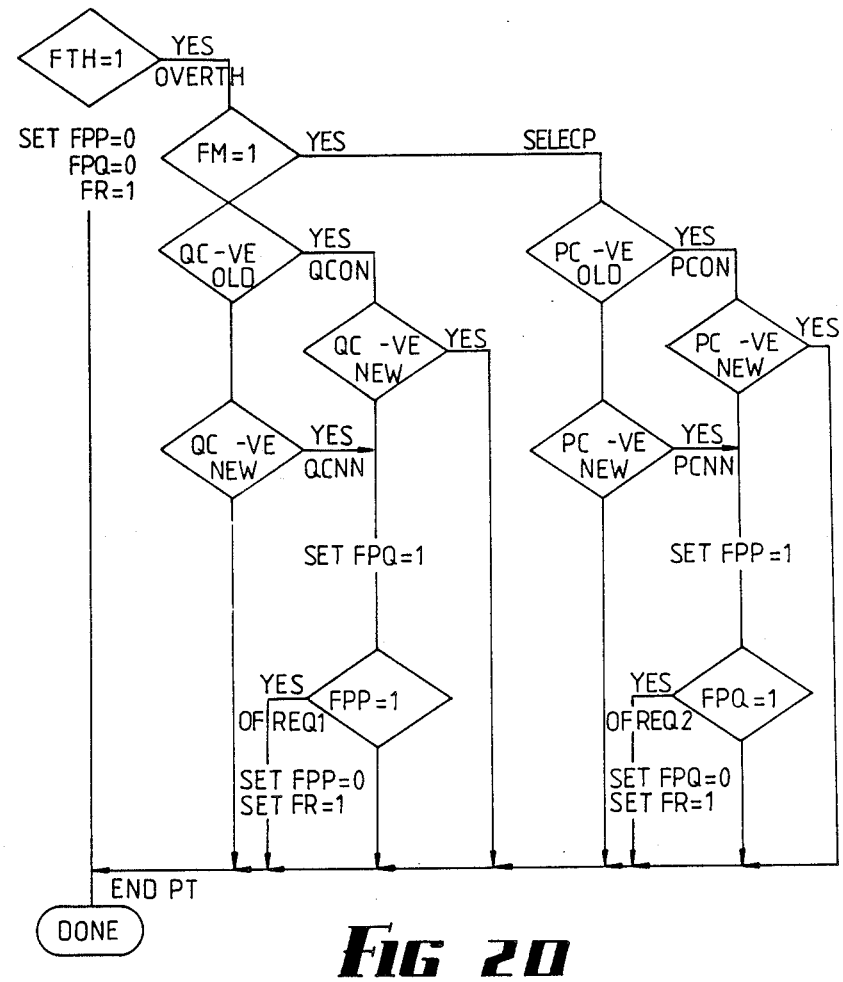
FIG. 20 is a computer program flow chart.

The improved frequency discrimination is achieved by checking the frequency of each of the lock-in amplifier outputs, i.e., P and Q. As explained before if the incoming signal frequency is slightly different from the lock-in amplifier frequency, then P and Q outputs will be at the difference frequency. This frequency can be checked by using the P and Q zero crossings to logically develop a rejection signal FR as shown in FIGS. 10, and 20. This logic is performed by a routine in the microcomputer and uses three flags, Fth the threshold flag, Fpp the P polarity flag and Fpq the Q polarity flag.

This routine is used to reject all frequencies other than that which is identical to the correlator frequency. Correlator outputs P and Q are examined. If the received signal frequency is the same as the lock-in amplifier frequency then P and Q are D.C. voltages. If the received signal has a frequency which differs from the lock-in amplifier frequency then P and Q are at the difference frequency. Two polarity flags are used Fpp and Fpq. When the received signal is above threshold these flags are set, respectively, when P and Q cross the zero line. If one of these flags is set when the other is already set then 'reset' flag Fr is set and the flag which was already set is reset. Now Fr causes a read of signal check counter Csc and at the same time resets it to 0. Signal check counter Csc measures the time the total signal S is above threshold. Hence if the period between successive settings of Fr is less than that required for a legitimate bit, the bit is rejected. For example, the required minimum bit duration for a 'START 0' bit is 3.8 s. If Fr is set more often then every 3.8 s, signal check counter Csc cannot reach the required count and hence the bit is rejected. The shortest bit is a CODE bit. Its minimum required duration is 2.4 s. Hence rejection will occur for all frequencies which differ from the correlator frequency by more than $1/(2 \times 2.4) = 0.208$ Hz.

The above frequency checks on P and Q result in the characteristic shown in FIG. 11. In FIG. 11, the broad bandpass width of prior art is graphically depicted. This was greatly narrowed in our earlier further narrowed in this invention as shown in FIG. 11.

As each bit is received the microcomputer decides whether it is a START or a CODE bit according to its duration. All decoding of the signal is done by the microcomputer 44.

The 50 Hz going in to the phase locked loop from the 16,384 divider is compared in phase with the 50 Hz supply input. If the phase difference is greater than 300 $\mu$s the loop is considered to be OUT OF LOCK. Whenever an out of lock occurs the timers measuring signal duration are reset.

When a receiver is used to control a storage hot water system, it is an advantage from a power system point of view to allow only one heating period during any prescribed ON time. For instance if an ON time is allowed between 10 pm and 7 am, then most heaters will attain full temperature say by 5 am and their thermostats will open. If a household then uses hot water at say 6 am, the thermostat will close and a second heating period will commence. This second heating period places load on the power system at a time when the other loads are heavy (industry just starting up) and should therefore be avoided. The prescribed ON time cannot be made shorter because a small number of consumers will require the full time for their storage system to reach full temperature.

To prevent the second heating period a lockout routine is included which senses the condition that no load current is flowing when the contactor is closed (hence the thermostat must be open). Under these conditions the microcomputer operates the contactor to the OFF position. The contact sense and current sense circuits are described later.

An over-ride timer routine is included to provide a fail-safe feature in the event of loss of communication with a sub-station. This can occur due to temporary feeder changes or a transmitter failure. This timer causes the output contactor to close 6.2 hours after the receipt of the last OFF command. If the contactor is required to remain off, a signal must be transmitted before the 6.2 hours expires in order to reset the timer. The only signal required to reset the timer is a START bit.

A software routine is included in the microcomputer 44 which enables the switch ON of low usage consumers to be delayed. By timing each day the duration the water heater is energized and averaging this over a week a consumer's usage can be assessed. After an ON signal is sent, actual switch on can then be delayed in inverse proportion to normal usage. All these functions are embodied in the microcomputer software. This allows the load of low usage consumers to be transferred to the early hours of the morning where there is a "trough" in the daily load curve.

Figure 12:
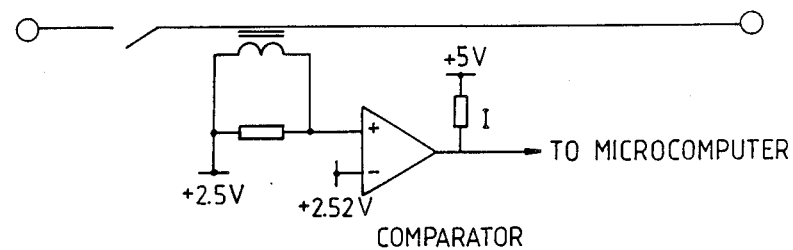
FIG. 12 shows the current sensing means.

Current flow in the load circuit is sensed by means of a small current transformer as shown in FIG. 12.

When load current flows, output I goes high on a 50 Hz basis. For no load current, I is low. The transition of I to the high state initiates an interrupt routine in the microcomputer. Current sense is used in the "lockout" and "delay" routines.

The position (open or closed) of the output contactor 43 is sensed with the circuit shown in FIG. 13.

When the contact is open output C is low. When the contact is closed C goes high on a 50 Hz basis which is sensed by the microcomputer. Contact sense is used in the "decoding" and "lockout" routines.

The output contactor needs to be mechanically bistable and of the impulse type. That is, it should have only one coil which is energised for a short time (approximately 40 ms) to change the state of the contact. The relay should be as efficient as possible to minimise the power required to drive it. A single make contact is required having a current rating of at least 30 amperes AC resistive.

Figure 14:
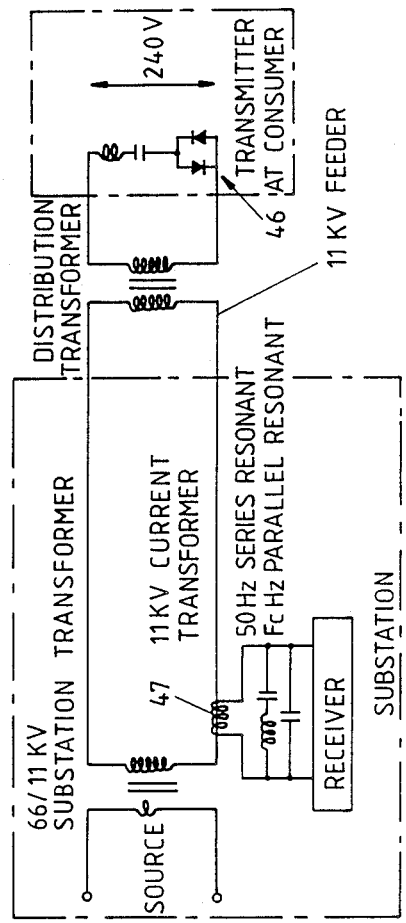

The same principles outlined so far, and method of coding can be used for signalling from a consumer back to a sub-station. This is referred to as upstream signalling. There is one important difference, however, between upstream and downstream signalling. Whereas downstream is a voltage scheme, upstream uses current. In downstream signalling a signal voltage of a very precise frequency is superimposed on the normal system voltage and this is detected by a lock-in amplifier in the receiver. In upstream signalling a very small transmitter 46, but still of the same configuration as described above, is located at the consumer. The transmitter current is at a very precise frequency and may be detected at the sub-station by first isolating it with current transfomer 47, turning it into a voltage with an impedance and then using the lock-in amplifier to detect it. The basic arrangement is shown in FIG. 14.

As before, a multi-frequency scheme can be used for coding. However, if variable data is required to be transmitter rather than control signals to specific addresses then a bank of fixed lock-in amplifiers will be required, one for each frequency used. For example, if 10 frequencies are used to transmit decimal information, 10 lock-in amplifiers will be required and each frequency will represent a decimal number. As many different frequencies are available for use, simultaneous transmissions are possible on the same feeder. Simultaneous transmissions using the same frequencies are also possible on different feeders as each feeder current is entirely separate.

It is quite important to note that the thyristor control is such that firing of the thyristors is in a pattern (FIGS. 16, 18 and 19), the pattern frequency being the same as the power system frequency but phase shifted from it, such that for one-half the period of the pattern, the transmitter load current is continuous from the positive half cycle to the negative half cycle and for the other half period transmitter load current is continuous from the negative half cycle to the positive half cycle, the basic firing frequency being the signal frequency required and the resonant frequency of the inductance capacitance combination being about 20% (between 5% and 50%) higher than the signal frequency (for the lower frequencies) thus causing discontinuous oscillation because of the short periods of zero load current. For higher frequencies, the capacitance inductance combination has about the same resonant frequency as the signal frequency and the firing pattern of the thyristors is such that oscillation is continuous except for one complete period of the oscillation following each transition of the pattern frequency. For still higher frequencies the capacitance inductance combination has about the same resonant frequency as the signal frequency and oscillation is only allowed on every alternate cycle.

Alternatively, the necessary changes being made, the frequency control means to control the lock-in amplifiers 35 of the receivers comprise crystal controlled oscillators 50 (FIG. 6A). Similarly, FIG. 1A shows a crystal controlled oscillator 51 for generating the frequency of the thyristor firing in the transmitter control unit 29. In both instances, the control frequencies are obtained by variable dividers, as in the embodiment described above in which control frequencies are synthesised from the power system frequency and are therefore locked to it. In the alternative system using crystal oscillators the control frequencies are not locked to the power system frequency.

In all instances it will be noted that the downstream signals are voltage signals and the upstream signals are current signals, this being necessary because of the inherent impedances of a power supply network.

While the consumer receiver and transmitter is separately described above, it will be recognised by those skilled in the art that a common frequency synthesiser and microcomputer combination can be used both for receiving and transmitting modes.

Reversals of phase in the transmitted signal which is referred to above is achieved merely by delaying the firing of the thyristors by 180°.

The claims defining the invention are as follows; I claim:

1. In a ripple control system for an alternating current electric power distribution system which comprises a transmitter for transmitting a code and a receiver for receiving said code, said transmitter being coupled to the electric power distribution system to superimpose a signal on the power frequency waveform as a sequence of waveform distortions, the improvements comprising:
frequency control means to accurately generate closely spaced frequencies in the transmitter to enable the use of multifrequency codes, an input detector circuit in said receiver having two lock-in amplifiers driven ninety degrees out of phase with each other, means for squaring and summing the lock-in amplifier outputs to form a combined non-phase sensitive output, discrimination means comprising a microcomputer so coupled to the output of each said lock-in amplifier that a flag of the microcomputer is a threshold flag responsive to said lock-in amplifier combined non-phase sensitive output magnitude and two other flags thereof are responsive to zero crossings of each said lock-in amplifier output such that signal rejection occurs when (a) said signal magnitude is below a set threshold, and (b) when said magnitude exceeds that set threshold and the time between successive zero crossings of either said output is less than a set minimum.

2. Improvements in a ripple control system according to claim 1 further comprising a transmitter transformer, said transmitter being coupled by that transformer to the distribution system to derive power therefrom and generate signals by means of sequences of waveform distortions, a phase-locked loop multiplier synthesising the frequencies of said signals and locking those frequencies to the power frequency.

3. In a ripple control system for an alternating current electric power distribution system which comprises a transmitter for transmitting a code and a receiver for receiving said code, said transmitter being coupled to the electric power distribution system to superimpose a signal on the power frequency waveform as a sequence of waveform distortions, the improvements comprising:

an inductance in series with a capacitance in said transmitter, a pair of thyristors connected in inverse parallel and arranged to be fired by a transmitter control unit in a pattern, a transformer also in said transmitter and coupling the signals generated by said firing to the power system, said transmitter being coupled by that transformer to the distribution system to derive power therefrom and generate signals by means of sequences of waveform distortions, a phase-locked loop multiplier synthesising the frequencies of said signals and locking those frequencies to the power frequency, said receiver comprising an input detector circuit having two lock-in amplifiers driven ninety degrees out of phase with each other, means for squaring and summing the outputs of those said amplifiers to form a combined non-phase sensitive output, and discrimination means comprising a microcomputer so coupled to each of said amplifiers as to logically examine zero crossings of the two said lock-in amplifier outputs as to produce rejection of incoming signals when the period between said zero crossings of either said output is less than a set minimum.

4. Improvements in a ripple control system according to a claim 3 wherein said inductance capacitance combination has a resonant frequency higher than said signal frequency and said transmitter control unit is arranged to fire the thyristors at the signal frequency resulting in gaps of zero current following each half cycle of oscillation current.

5. Improvements in a ripple control system according to claim 3 wherein said inductance capacitance combination has a resonant frequency higher than said signal frequency and said transmitter control unit is arranged to fire the thyristors at the signal frequency but comprises control means additionally controlling firing of the thyristors such that when a logic signal of the frequency of the electric power distribution system, but phase shifted from that frequency, is logic HIGH then oscillation current is continuous from the positive half cycle to the negative half cycle with a gap of zero current following the negative half cycle, and when such logic signal is LOW oscillation current is continuous from the negative half cycle to the positive half cycle with a gap of zero current following the negative half cycle.

6. Improvements in a ripple control system according to claim 3 wherein said inductance capacitance combination has a resonant frequency near said signal frequency and said transmitter control unit is arranged to fire the thyristors at the signal frequency, but said control unit additionally controls firing of the thyristors, such that when a logic signal of mains frequency, but phase shifted from the mains, is logic HIGH then oscillation current is continuous until the logic signal changes to LOW whereupon following the first positive half cycle of oscillation current a gap of zero current ensues for one full signal frequency period, and when said logic signal changes from LOW to HIGH then following the first negative half cycle a gap of zero current ensues for one full signal frequency period.

7. Improvements in a ripple control system according to claim 3 wherein said inductance capacitance combination has a resonant frequency near said signal frequency and said transmitter control unit fires the thyristors basically at the signal frequency but additionally controls firing of the thyristors, such that when a logic signal of mains frequency, but phase shifted from the mains, is logic HIGH then oscillation current is continuous from the positive half cycle to the negative half cycle with a gap of zero current for one full signal period following the negative half cycle, and when the logic signal is LOW oscillation current is continuous from the negative half cycle to the positive half cycle with a gap of zero current for one full signal period following the positive half cycle, with an extra oscillation half cycle immediately following each logic transition.

8. Improvements in a ripple control system according to claim 3 wherein said code transmitted by said transmitter comprises a START bit consisting of a signal frequency being transmitted for a set period of time followed by a set period of no transmission followed by the transmission of at least one CODE comprising the transmission of a second frequency for a set period of time.

9. Improvements in a ripple control system according to claim 6 wherein said code is identified by the START bit duration and frequency, period between START bit and the first CODE bit, and each CODE bit duration and frequency.

10. Improvements in a ripple control system according to claim 6 further comprising phase reversal means by which each said bit is terminated by reversing the phase of the transmitted signal for sufficient time to achieve a sharp cut-off in the received signal.

11. Improvements in a ripple control system according to claim 3 wherein said phase-locked loop frequency multiplier synthesises said frequency control means to control the lock-in amplifiers in the receiver and thyristor firing in the transmitter control unit, from the power mains frequency of the electric distribution system firstly by fixed frequency multiplication of the power frequency, and a variable divider divides the multiplexed fixed frequency to produce a plurality of control frequencies.

12. Improvements in a ripple control system according to claim 3 wherein said power distribution has a power supply end and consumer ends, said transmitter being at the power supply end and the signal being transmitted by said distribution system to a said consumer end as a voltage signal.

13. Improvements in a ripple control system according to claim 3 wherein said power distribution has a power supply end and consumer ends, said transmitter being at a said consumer end of said distribution system and the signal is transmitted by said distribution system to the power supply end as a current signal.

14. Improvements in a ripple control system according to claim 13 further comprising a current transformer and impedance at said power supply end isolating and transforming said current signal to a voltage signal which is directed into said receiver.

15. Improvements in a ripple control system according to claim 1 further comprising a transmitter transformer, said transmitter being coupled by that transformer to the distribution system to derive power therefrom and generate signals by means of sequences of waveform distortions, and a crystal controlled oscillator so coupled to the transmitter as to superimpose said signal on the power frequency waveform as a sequence of waveform distortions which are at a frequency derived from the crystal oscillator.

16. Improvements in a ripple control system according to claim 1 wherein said frequency control means to control the lock-in amplifiers in the receiver and the thryistor firing in the transmitter control unit is derived from respective crystal controlled oscillators generating a base frequency followed by a variable divider to produce a plurality of control frequencies.

17. Improvements in a ripple control system according to claim 4 further comprising an additional inductor in parallel with said inductance capacitance combination, said additional inductor cooperating with said inductance capacitance combination to control and increase the level of current oscillation in the circuit.

* * * * *